(12) United States Patent  (10) Patent No.: US 8,744,377 B2
Rimini et al.  (45) Date of Patent: Jun. 3, 2014

(54) METHOD AND APPARATUS FOR ADAPTIVE NON-LINEAR SELF-JAMMING INTERFERENCE CANCELLATION

(75) Inventors: Roberto Rimini, San Diego, CA (US); Peter D. Heidmann, San Diego, CA (US); Joseph P. Burke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 12/973,524

(22) Filed: Dec. 20, 2010

(65) Prior Publication Data

US 2011/0149714 A1  Jun. 23, 2011

Related U.S. Application Data

(60) Provisional application No. 61/288,807, filed on Dec. 21, 2009.

(51) Int. Cl.
*H04B 1/04* (2006.01)
(52) U.S. Cl.
USPC ....... 455/114.2; 455/63.1; 455/296; 375/144; 375/346
(58) Field of Classification Search
None
See application file for complete search history.

(56) References Cited

U.S. PATENT DOCUMENTS

| 7,155,179 | B1 * | 12/2006 | Rothenberg | 455/114.2 |
| 8,055,235 | B1 * | 11/2011 | Gupta et al. | 455/296 |
| 8,170,487 | B2 * | 5/2012 | Sahota et al. | 455/63.1 |
| 8,175,535 | B2 * | 5/2012 | Mu | 455/67.11 |
| 2003/0031279 | A1 * | 2/2003 | Blount et al. | 375/346 |
| 2007/0184782 | A1 | 8/2007 | Sahota et al. | |
| 2009/0036082 | A1 * | 2/2009 | Sajid et al. | 455/296 |
| 2009/0213770 | A1 * | 8/2009 | Mu | 370/281 |
| 2010/0159837 | A1 * | 6/2010 | Dent et al. | 455/63.1 |

FOREIGN PATENT DOCUMENTS

WO  WO2009090400  7/2009

OTHER PUBLICATIONS

International Search Report and Written Opinion—PCT/US2010/061638, International Search Authority—European Patent Office—Mar. 15, 2011.

* cited by examiner

*Primary Examiner* — Donald Mills
(74) *Attorney, Agent, or Firm* — François A. Pelaez

(57) ABSTRACT

Certain embodiments of the disclosure propose a method for cancelling co-channel interference (self-jamming) generated by nonlinearities in the radio-frequency (RF) front-end devices. The proposed method utilizes an adaptive non-linear filter to generate a distorted version of the transmitted signal. The self-jamming interference may be mitigated utilizing the distorted signal through adaptive cancellation.

28 Claims, 8 Drawing Sheets

METHOD AND APPARATUS FOR ADAPTIVE NON-LINEAR SELF-JAMMING INTERFERENCE CANCELLATION

CLAIM OF PRIORITY UNDER 35 U.S.C. §119

This application claims priority to U.S. Provisional Application No. 61/288,807, entitled "Adaptive Non-Linear Interference Cancellation of Self-Jamming Using Volterra Filters," filed Dec. 21, 2009, and assigned to the assignee hereof and hereby expressly incorporated by reference herein.

FIELD

Certain embodiments of the disclosure generally relate to wireless communications and, more particularly, to cancelling self-jamming interference in a transceiver using Volterra filters.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex (TDD) and/or frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station. In an FDD system, forward and reverse link transmissions are on different frequency regions.

In a FDD transceiver, the strongest interference on a received signal may be caused by self-jamming leakage from a transmit (Tx) signal that is simultaneously transmitted by the transceiver. The Tx signal may leak to the receive path through the finite isolation (e.g., through a duplexer filter, antenna coupling, circuit card electromagnetic interference (EMI), and VLSI chip coupling). Although in a different frequency band, the Tx leakage signal may cause co-channel interference on the intended received signal due to excitations of some non-linear behavior in the Rx. This scenario is referred hereinafter as self-jamming. The co-channel interference may be generated when nonlinearities are excited in the radio frequency (RF) downconversion components: such as low noise amplifier (LNA), mixer, switches, filters, data converters and other like components.

Two of the most relevant effects of nonlinearities are second-order inter-modulation distortion (IM2), and third order cross-modulation (Xmod). The Xmod is a combination of the Tx leakage plus adjacent narrow-band interference. As will be described in greater detail below, higher order interference non-linearities (both even-order and odd-order) may also be cancelled utilizing a similar scheme, all of which fall in the scope of the disclosure.

The problem of transmit signal leakage and subsequent potential IM2 and Xmod distortion in a frequency band may be addressed in different ways. A predominant type of solution utilizes analog RF approach which detects presence of an adjacent jammer and increases the current drawn in the mixer to improve linearity. Obviously, this approach results in higher power consumption and hence reduces talk-time of a wireless device. In certain scenarios existing analog solutions may not be enough to keep non-linear distortion signals from negatively impacting the receiver performance. In both of these example scenarios, an improved solution is desirable.

SUMMARY

Certain aspects of the disclosure provide a method for reducing the effects of self-jamming leakage for wired and wireless communications. The method generally includes generating a signal to be transmitted on a first frequency band, constructing an additional distorted version of the generated signal by applying a non-linear distortion to a baseband portion of the generated signal, transmitting the generated signal on the first frequency band, receiving a signal on a second frequency band, the received signal being corrupted by self-jamming interference, wherein where the self-jamming interference is caused by any type of non-linearities generated by transmit and receive chains, and subtracting the additional distorted version of the generated signal from the received signal to remove the self-jamming interference.

Certain aspects of the disclosure provide an apparatus. The apparatus generally includes means for generating a signal to be transmitted on a first frequency band, means for constructing an additional distorted version of the generated signal by applying a non-linear distortion to a baseband portion of the generated signal, means for transmitting the generated signal on the first frequency band, means for receiving a signal on a second frequency band, the received signal being corrupted by self-jamming interference, wherein where the self-jamming interference is caused by any type of non-linearities generated by transmit and receive chains, and means for subtracting the additional distorted version of the generated signal from the received signal to remove the self-jamming interference.

Certain aspects of the disclosure provide an apparatus. The apparatus generally includes at least one processor configured to generate a signal to be transmitted on a first frequency band, construct an additional distorted version of the generated signal by applying a non-linear distortion to a baseband portion of the generated signal, transmit the generated signal on the first frequency band, receive a signal on a second frequency band, the received signal being corrupted by self-jamming interference, wherein where the self-jamming interference is caused by any type of non-linearities generated by transmit and receive chains, and subtract the additional distorted version of the generated signal from the received signal to remove the self-jamming interference; and a memory coupled with the at least one processor.

Certain aspects of the disclosure provide a computer-program product comprising a computer-readable medium having instructions stored thereon. The instructions are generally executable by a processor for generating a signal to be transmitted on a first frequency band, constructing an additional distorted version of the generated signal by applying a non-linear distortion to a baseband portion of the generated signal, transmitting the generated signal on the first frequency band, receiving a signal on a second frequency band, the received signal being corrupted by self-jamming interference, wherein where the self-jamming interference is caused by any type of non-linearities generated by transmit and receive chains, and subtracting the additional distorted version of the generated signal from the received signal to remove the self-jamming interference

DETAILED DESCRIPTION

Figure 1:
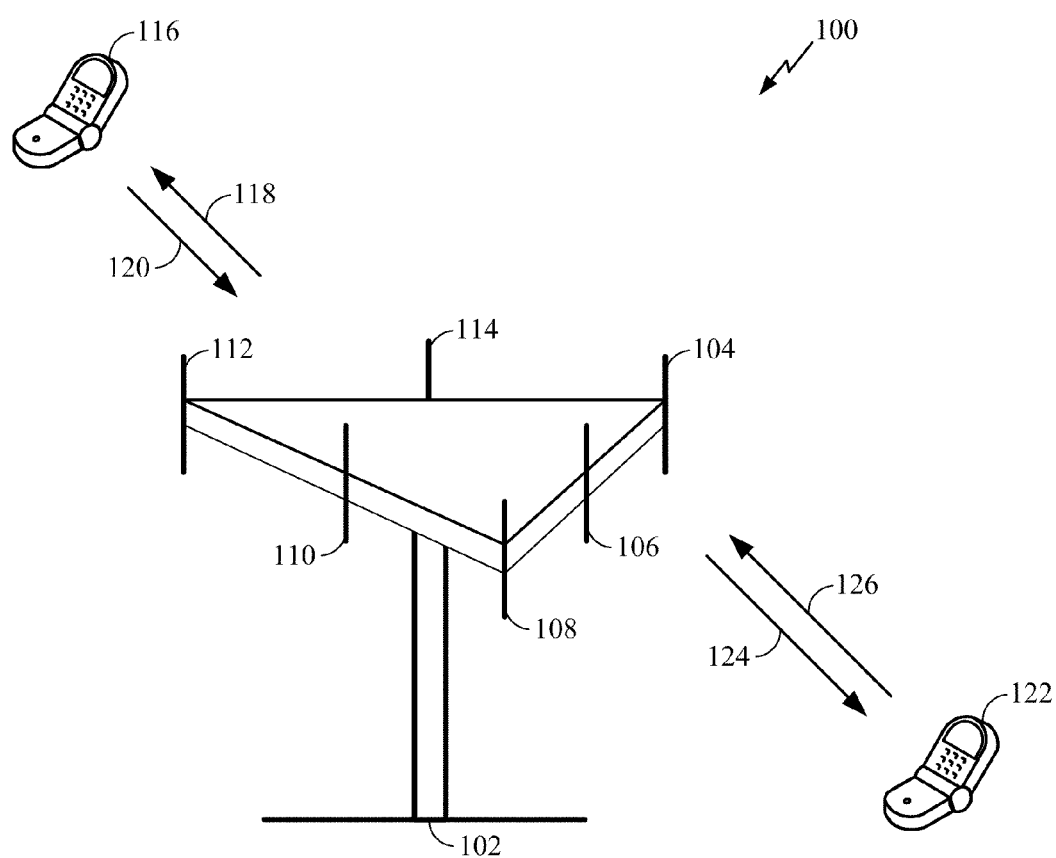
FIG. 1 illustrates a multiple access wireless communication system, in accordance with certain embodiments of the disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), the Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various applications involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ratio (PAPR) because of its inherent single carrier structure. SC-FDMA may be used in the uplink communications where lower PAPR greatly benefits the mobile terminal in terms of transmit power efficiency.

Referring to FIG. 1, a multiple access wireless communication system 100 according to one aspect is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over downlink or forward link 118 and receive information from access terminal 116 over uplink or reverse link 120. Access terminal 122 is in communication with antennas 106 and 108, where antennas 106 and 108 transmit information to access terminal 122 over downlink or forward link 124 and receive information from access terminal 122 over uplink or reverse link 126. In a Frequency Division Duplex (FDD) system, communication links 118, 120, 124 and 126 may use a different frequency for communication. For example, downlink or forward link 118 may use a different frequency than that used by uplink or reverse link 120.

Each group of antennas and/or the area in which they are designed to communicate is often referred to as a sector of the access point. In an aspect, antenna groups each are designed to communicate to access terminals in a sector of the areas covered by access point 102.

In communication over downlinks or forward links 118 and 124, the transmitting antennas of access point 102 utilize beamforming in order to improve the signal-to-noise ratio (SNR) of downlinks or forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal, or some other terminology. For certain aspects, either the AP 102 or the access terminals 116, 122 may utilize the proposed interference cancellation technique to improve performance of the system.

Figure 2:
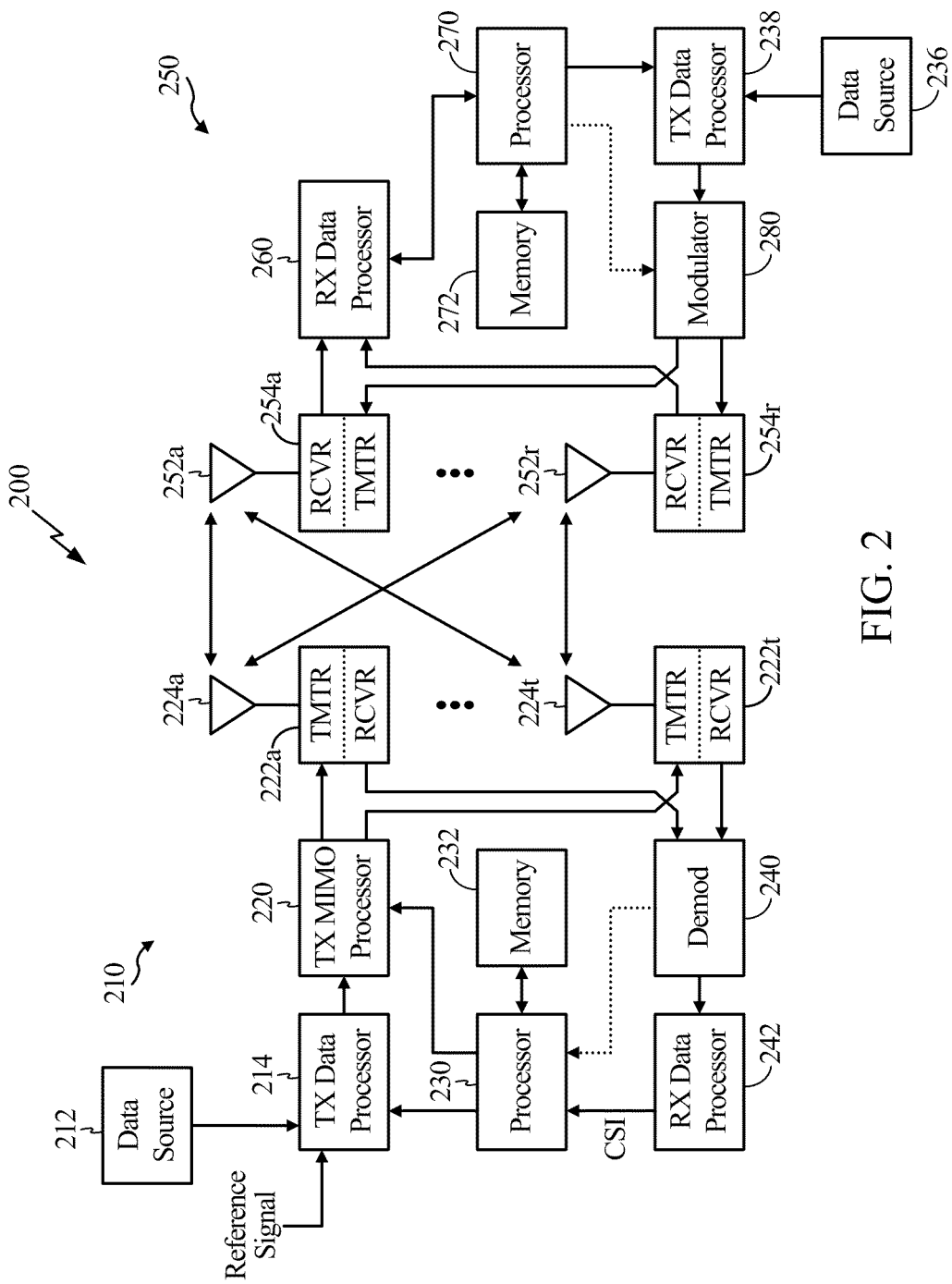
FIG. 2 illustrates a block diagram of a communication system, in accordance with certain embodiments of the disclosure.

FIG. 2 is a block diagram of an aspect of a transmitter system 210 and a receiver system 250 in a MIMO system 200. At the transmitter system 210, traffic data for a number of data streams is provided from a data source 212 to a transmit (TX) data processor 214. An embodiments of the disclosure is also applicable to a wireline (wired) equivalent system of FIG. 2

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M may be a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210. As described in further detail below, the RX data processor 260 may utilize interference cancellation to cancel the interference on the received signal.

Processor 270, coupled to a memory 272, formulates a reverse link message. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250.

Certain embodiments of the disclosure propose a method for cancelling co-channel interference generated by nonlinearities in the radio-frequency (RF) front-end devices (self jamming). The proposed method utilizes reduced-size Volterra series to reconstruct a distorted version of the transmitted signal. The self-jamming interference may be mitigated utilizing the distorted signal.

The RF front-end devices may be excited by strong out-of-band interference, such as leakage of a transmitted signal in the receive-path through a duplexer. Although the leakage interference may be in a different frequency band, due to its high power level, the interference may excite nonlinearities of an RF front-end stage. As a result, spectral duplication of the transmitted signal may overlap with the intended received signal which may cause significant signal degradation.

The interference from a transmitter entering the receive path is commonly encountered in commercial wireless transceivers operating in full-duplex. For certain embodiments, the proposed method uses a completely digital baseband approach to apply an appropriate distortion to the baseband transmit waveform. The distortion may be known at the receiver and may be subtracted from the received signal. The proposed method may mitigate problem of transmit leakage through the duplexer for third or fourth generations (3G/4G) of frequency division duplex (FDD) cellular systems and, in general, all full-duplex communication systems.

Certain embodiments replicate and reconstruct a similar distortion produced by the analog front-end in digital baseband. Therefore, the reconstructed distortion signal may be subtracted from the corrupted received signal to remove the interference caused by the analog front-end; thus, significantly improving the overall signal to interference plus noise ratio (SINR) of the system.

In practice, unavoidable nonlinearities introduced by the analog front-end and/or down-conversion circuits may result in a transmit jamming spectrum which may obscure the intended received signal. Therefore, filtering may not be possible to mitigate this effect. Instead, for certain embodiments, the baseband transmit (Tx) waveform may appropriately be pre-distorted such that the distorted signal closely resembles the analog distorted Tx leakage waveform. The composite received signal may include the intended received signal plus the Tx jammer signal. Therefore, subtracting the distorted Tx signal from the composite received signal may result in significant interference reduction.

For certain embodiments, the non-linear baseband distortion may be generated through a digital non-linear adaptive filter (e.g., based on a reduced set of Volterra series). For example, the proposed scheme may cancel second order inter-modulation distortion (IM2) and/or Cross-modulation (Xmod) to reduce self-jamming interference. In these scenarios, a filter using Volterra series may apply a second order and fourth order power term to the baseband Tx signal and linearly combine the resultant signals through appropriate weights to generate a distorted waveform. The resultant distorted baseband waveform may be subtracted from the composite received signal. Higher order interferences may also be cancelled utilizing a similar scheme, all of which fall in the scope of the disclosure.

Figure 3:
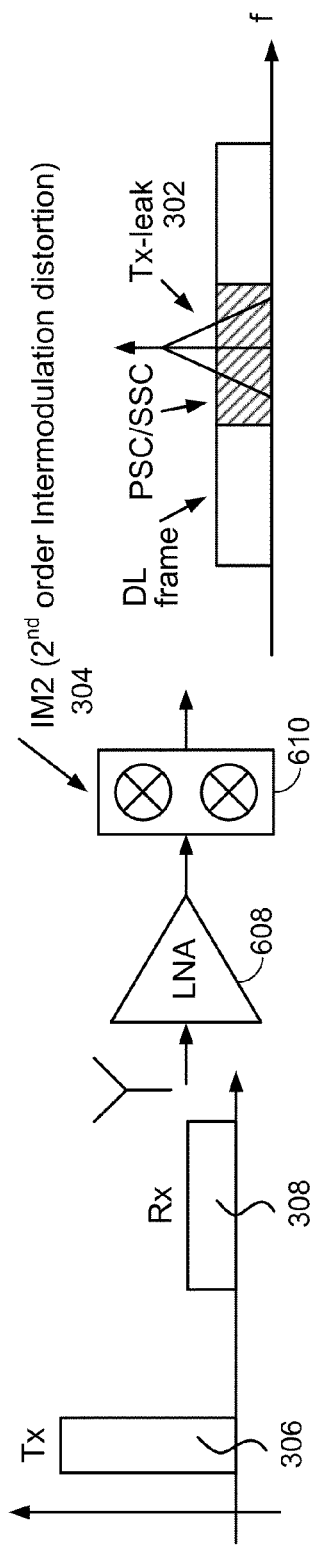
FIG. 3 illustrates an example second order inter-modulation distortion (IM2) effect on out-of-band interference, in accordance with certain embodiments of the disclosure.

FIG. 3 illustrates an example second order inter-modulation distortion effect on out-of-band interference, in accordance with certain embodiments of the disclosure. As illustrated, a high power signal 306 may be transmitted by a transceiver while a lower power signal 308 may be received through the receiver. The received signal may pass through a low noise amplifier (LNA) 608 and a mixer 610. Base-band down-conversion of transmitter leakage 302 through IM2 304 may fall at direct current (DC) portion of the spectrum, thus de-sensitizing the zero intermediate frequency (ZIF) receiver at low signal-to-noise ratios (SNRs). For LTE systems, the transmitter leakage may overlap with primary synchronization code (PSC), secondary synchronization code (SSC) or other baseband signals.

Figure 4:
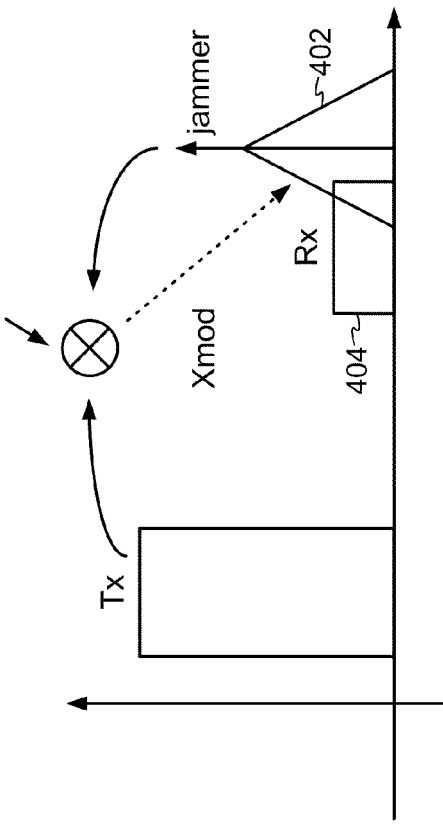
FIG. 4 illustrates an example third order cross-modulation distortion (Xmod) effect on out of band interference, in accordance with certain embodiments of the disclosure.

FIG. 4 illustrates an example showing effect of third order cross-modulation distortion on out-of-band interference, in accordance with certain embodiments of the disclosure. As illustrated, cross-modulation 402 of Tx leakage with adjacent jammer may obscure desired received signal 404.

Both of the second-order inter-modulation distortion and cross-modulation effects may be important in systems that operate in compliance with the LTE standard due to vulnerability of the primary synchronization channel (PSCH) and synchronization channel (SCH) to DC-centered interference.

For certain embodiments, nonlinear behavior of a system may be characterized by Volterra series, as follows:

$$y[k] = \sum_{m_1=0}^{M_1-1} h_1[m_1]x[k-m_1] + \sum_{m_1=0}^{M_2-1}\sum_{m_2=0}^{M_2-1} h[m_1, m_2]x[k-m_1]x[k-m_2] + \ldots + \sum_{m_1=0}^{M_p-1}\sum_{m_2=0}^{M_p-1}\sum_{m_p=0}^{M_p-1} h[m_1, m_2, \ldots m_p]\prod_{i=1}^{M_p} x[k-m_i] \quad (1)$$

in which $M_1$, $M_2$ and $M_P$ represent the memory set associated with each term of the Volterra series. P represents order of the power series. h[.] represents the impulse response of the system, and x(.) represents an input signal.

Low-pass equivalent expression for second and fourth order nonlinearities may be represented by Volterra series, as follows:

$$y[k] = \sum_{m_1=0}^{M_2-1}\sum_{m_2=0}^{M_2-1} h_2[m_1, m_2]x[k-m_1]x^*[k-m_2] + \sum_{m_1=0}^{M_4-1}\sum_{m_2=0}^{M_4-1}\sum_{m_3=0}^{M_4-1}\sum_{m_4=0}^{M_4-1} h_4[m_1, m_2, m_3, m_4] \quad (2)$$

$$x[k-m_1]x^*[k-m_2]x[k-m_3]x^*[k-m_4]$$

in which $h_2$ and $h_4$ represent the multi-dimensional impulse response and x* represents complex conjugate of x and $M_i$ memory depth of the i-th term.

Assuming a memory-less system, in which $M_2$ and $M_4$ are equal to one, the simplified (e.g., static only) Volterra expression may be written as:

$$y[k] = h_2(x[k])^2 + h_3(x[k])^3 \ldots + h_p(x[k])^p \quad (3)$$

in which p may be any integer number. As will be described in greater detail below, both even order, odd order, or the combination thereof may be addressed in various implementations.

Equation (3) may be linear with respect to $h_i$ coefficients (i=2, 3, . . . p); therefore, these coefficients may be calculated utilizing mean squared error (MSE) minimization.

Figure 5:
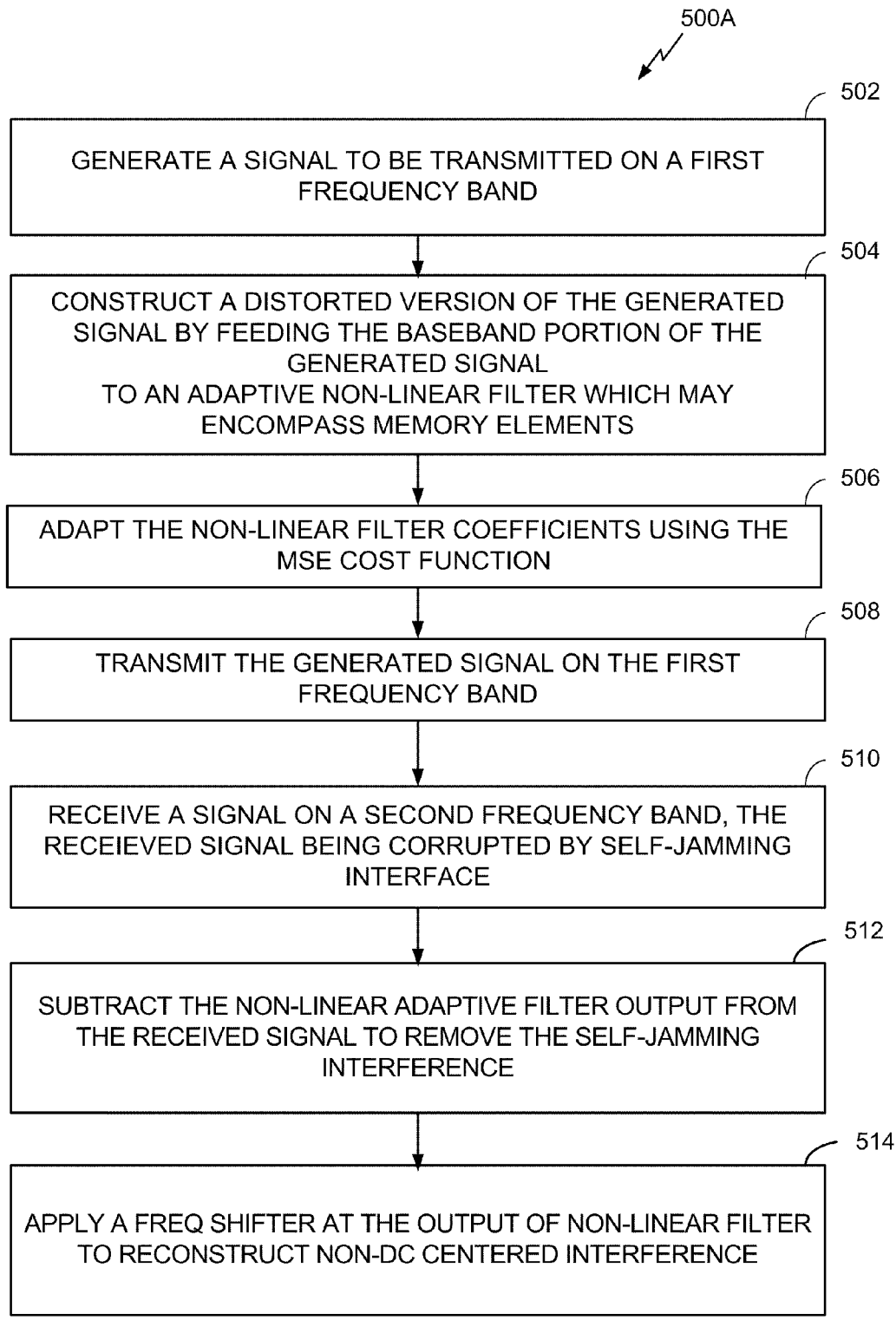
FIG. 5 illustrates example operations for cancelling self-jamming interference using Volterra filters, in accordance with certain embodiments of the disclosure.

FIG. 5 illustrates example operations 500 for cancelling self-jamming interference using Volterra filters, in accordance with certain embodiments of the disclosure. While the operations below refer to a transmitter and receiver, it should be understand that these components may be on the same apparatus. At 502, a transmitter generates a signal to be transmitted on a first frequency band. At 504, the receiver reconstructs a distorted version of the transmitted signal by feeding the baseband portion of the generated signal to an adaptive non-linear filter which may encompass memory elements. At 506, the receiver adapts the non-linear filter coefficients using an MSE cost function (e.g., so error in minimized). At 508, the transmitter transmits the generated signal on the first frequency band. At 510, the receiver receives a second signal on a second frequency band, the second signal being corrupted by self-jamming interface. At 512, the receiver subtracts the non-linear adaptive filter output from the second signal to remove the self-jamming interference. At 514, the receiver applies frequency shifting at the output of non-linear filter operators to reconstruct non-DC centered interference.

Figure 6:
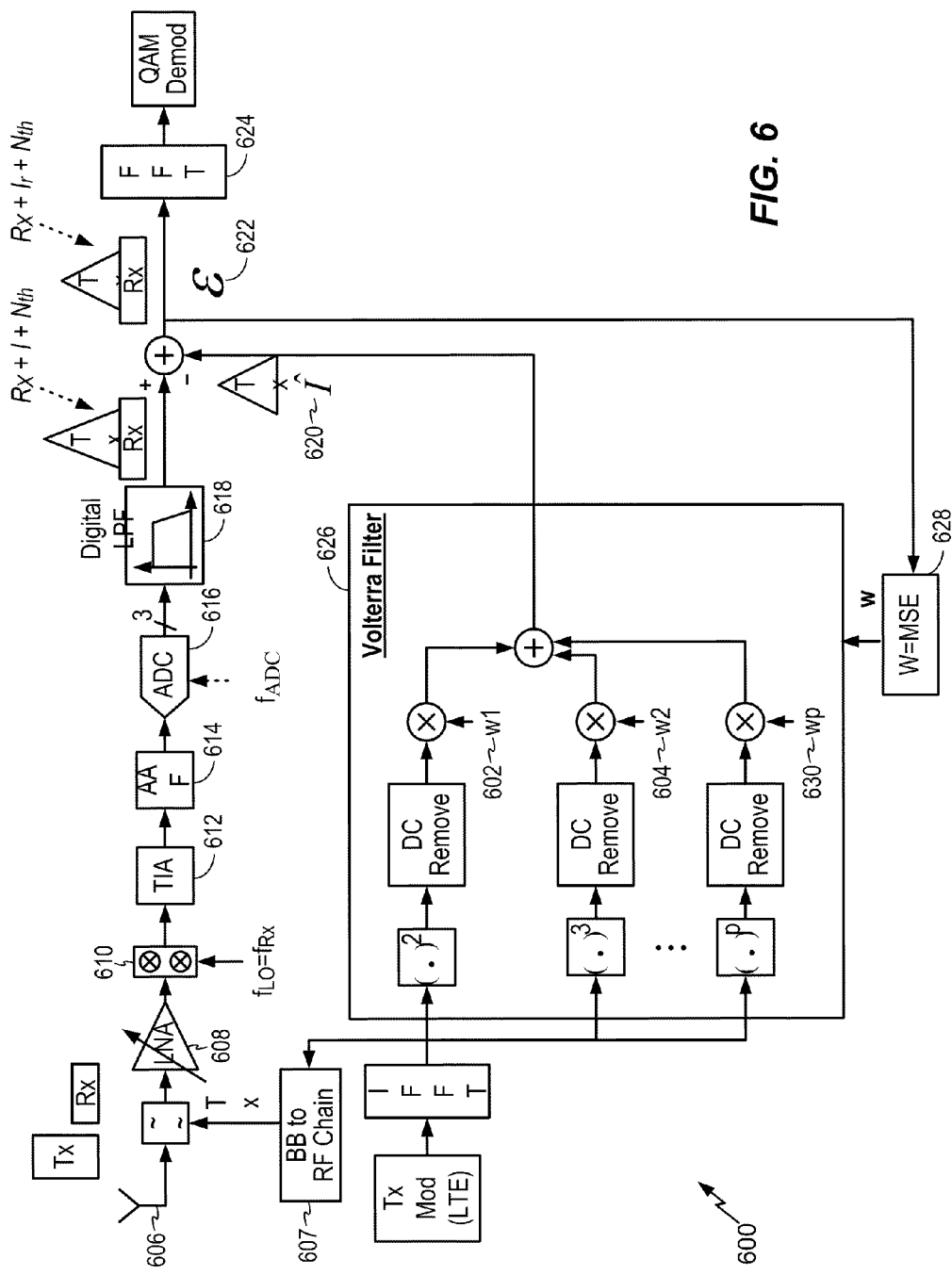
FIG. 6 illustrates an example adaptive nonlinear Volterra-based scheme for suppression of second order inter-modulation distortion, in accordance with certain embodiments of the disclosure.

FIG. 6 illustrates an example adaptive nonlinear Volterra-based scheme 600 for suppression of second order inter-modulation distortion, in accordance with certain embodiments of the disclosure. In this figure and the subsequent descriptions, I represents the interference, Î represents the amount of interference which is removed from the signal, $I_r$=I–Î represents a residual interference after interference cancellation.

As illustrated in FIG. 6, a signal is received by an antenna 606. The signal may be a combination of the intended received signal and the Tx leakage signal. The Tx leakage signal may be generated from the transmitted signal because of limited isolation between the transmit and receive chains.

The signal is down-converted to baseband after passing through low noise amplifier (LNA) 608 and mixer 610. Then, the signal is passed through trans-impedance amplifier (TIA) 612, anti-aliasing filter (AAF) 614 and analog to digital converter (ADC) 616. The AAF may filter the out-of-band intermediate frequencies (IF) before down-sampling, in order to reduce aliasing effect. The digital low pass filter (LPF) 618 filters out the high frequency components from the signal that is converted to digital through an analog to digital converter. The constructed distortion signal 620 is then subtracted from the signal to cancel the interference from the Tx leakage. The error signals ϵ 622 is then fed back to the mean square error (MSE) 628 calculation block to generate appropriate weights (W=$w_1$ 602 and $w_2$ 604 and $w_P$, 630) for the Volterra filter 626.

At the same time, a transmitted signal may pass through a Volterra filter, possibly after going through an Inverse Fast Fourier Transform (IFFT) for an LTE system. The Volterra filter generates the output signal Î based on the equations (1)-(3), by generating second order, fourth and up to 'p' order of the transmitted signal, removing the DC and multiplying them with weights adaptively estimated using MSE. The values of the MSE weights (e.g., $w_1$ 602 and $w_2$ 604 and $w_P$, 630) may be calculated by minimizing the mean square error cost function associated with the error signal ϵ 622 that is generated as follows:

Error=corrupted received signal–non-linear filter output.

For certain embodiments, minimizing power of the error signal ensures that portion of the composite signal which is correlated the most with the reconstructed interference is cancelled. In general, least mean square (LMS), recursive least squares (RLS) or any other algorithm may be used to minimize the MSE.

In addition, after the interference is removed from the received signal, in an LTE system, the signal may pass through a fast Fourier transform (FFT) 624 block before demodulation (e.g., Quadrature Amplitude Modulation (QAM)).

Figure 7:
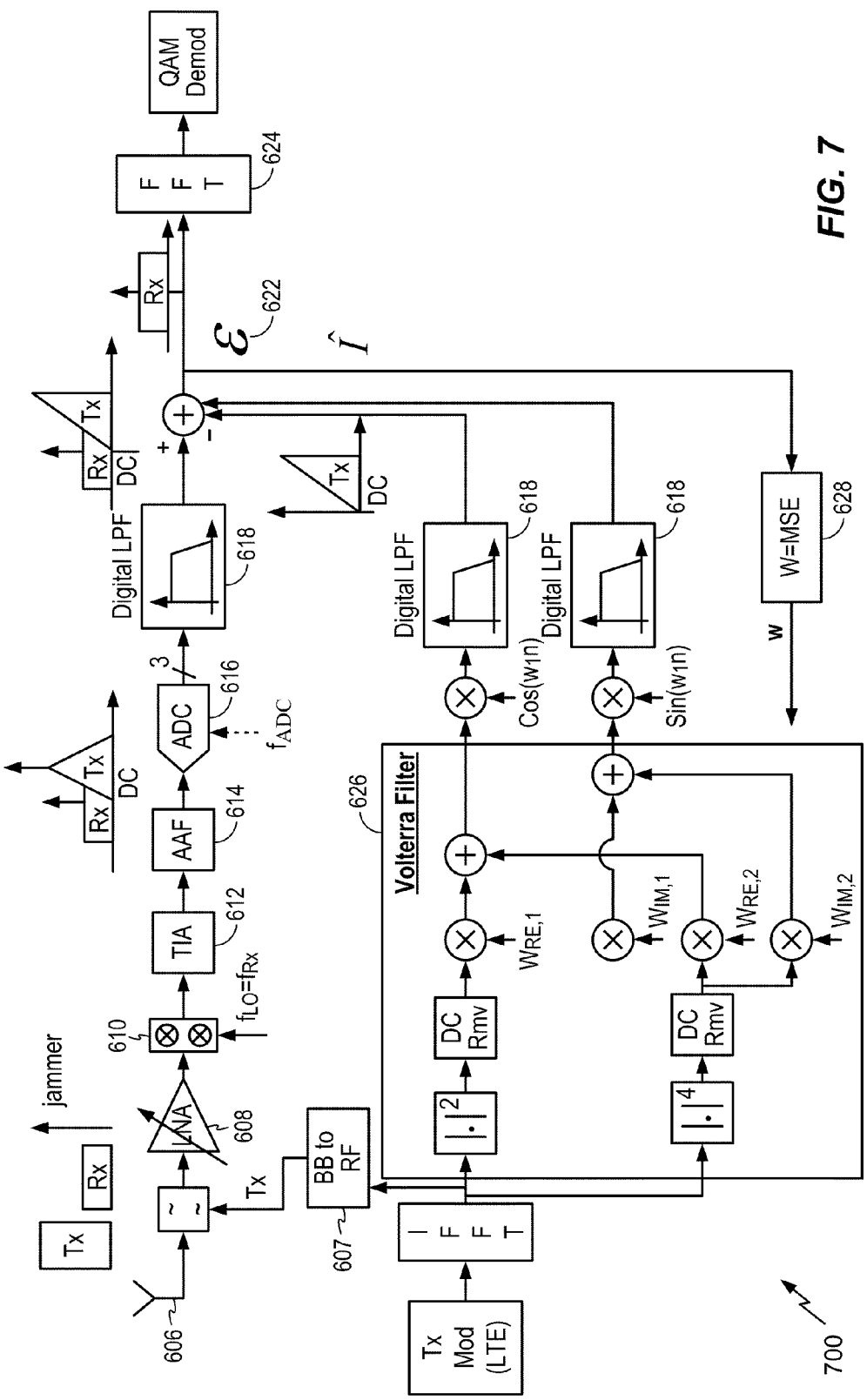
FIG. 7 illustrates an example adaptive non-linear Volterra-based scheme for canceling third order cross-modulation, in accordance with certain embodiments of the disclosure.

FIG. 7 illustrates an example adaptive non-linear Volterra-based scheme for cancellation of third order cross-modulation (Xmod), in accordance with certain embodiments of the disclosure. As illustrated, the third order cross modulation interference may still be cancelled by using Volterra filters. Most of the components in FIG. 7 are similar to the components in FIG. 6, with a difference that in FIG. 7 an appropriate frequency shifter is applied to the non-linear filter output to account for reconstruction of non DC centered interference.

Figure 8:
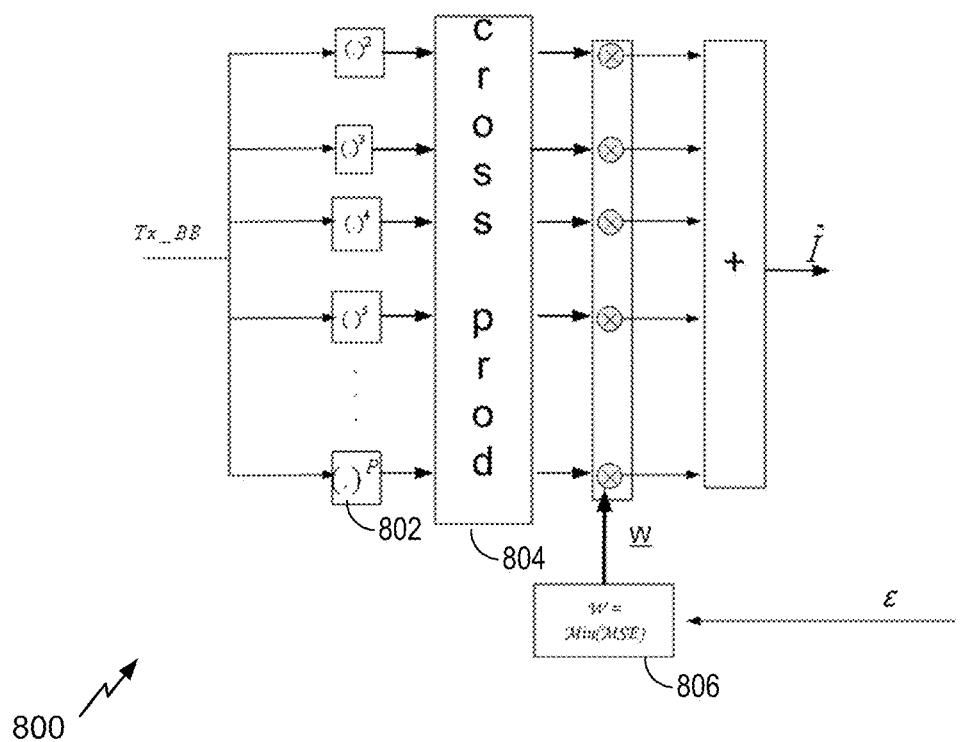
FIG. 8 illustrates a generic example of an adaptive nonlinear filter-based scheme that may be used in a scheme for interference cancellation from signals such as self-generated inter-modulation distortion.

Even-ordered Volterra filters have been shown in FIGS. 6 and 7 as specific, but not limiting examples. However, the techniques described herein may be applied using even-ordered, odd-ordered, or a combination of even and odd-ordered non-linear filters. FIG. 8 illustrates an example of a generic adaptive non-linear filter 800 that generically utilizes second-order to "p-order" non-linear filter elements 802. A flexible cross product block 804 may selectively generate cross products of any of its inputs to generate its output. As an example, one of the outputs of block 804 may be a cross product of the second-order and third-order inputs, while another output may be a cross product of the "p–1 order" and "p-order" inputs. As illustrated, a block 806 may select coefficients utilizing MSE. According to certain aspects, memory related effects may be taken into account by augmenting the non-linear filter operators with appropriate digital memory elements and applying non-linear filter operators as well as memory elements to the baseband portion of the generated signal.

While the examples shown in FIGS. 6 and 8 have shown a single transmitter, for illustrative purposes, the techniques described herein may be utilized in systems with multiple transmitters. The different transmitters may transmit on the same or different carriers. In some cases, such transmitters may enable a single "multi-mode" device to support different radio access technologies (RATs). Thus, multiple signals transmitted simultaneously in a multi-mode or multi-carrier transceiver may result in reciprocal intermodulation products. In such cases, the techniques described herein may help mitigate the effects of interference caused by reciprocal intermodulation when different types of transmitters are transmitting simultaneously.

Certain embodiments of the disclosure proposed an adaptive digital non-linear distorter that mimics the analog distortion introduced by the analog devices thus enabling non-linear interference cancellation. The digital distorter utilizes a non-linear adaptive filter based on a reduced Volterra series to mitigate second order inter-modulation and third order cross modulation effects generated by Tx leakage in FDD systems. Specifically, a plurality of higher order nonlinearities are applied to the baseband version of the Tx signal through high-order distortion operators. The proposed scheme is capable of significant interference reduction (approximately 90 percent). The proposed scheme may improve performance of a system by several dBs whenever a strong Tx leakage signal is present at the input of a LNA.

Furthermore, the suggested non-linear interference cancellation technique may relax the costly linearity requirements of a receiver chain. Utilizing the proposed scheme may result in lower power consumption and smaller size of the receiver down-conversion chain. The proposed scheme has limited complexity due to few taps, therefore, may easily be implemented in hardware. The proposed scheme may be suitable for recursive weight estimation such as least mean square (LMS), recursive least square (RLS), and the like.

Contrary to analog-based solutions, the proposed self-jamming interference cancellation scheme may fully be implemented in digital domain without a need for extra devices and/or fine calibration procedures.

Figure 5A:
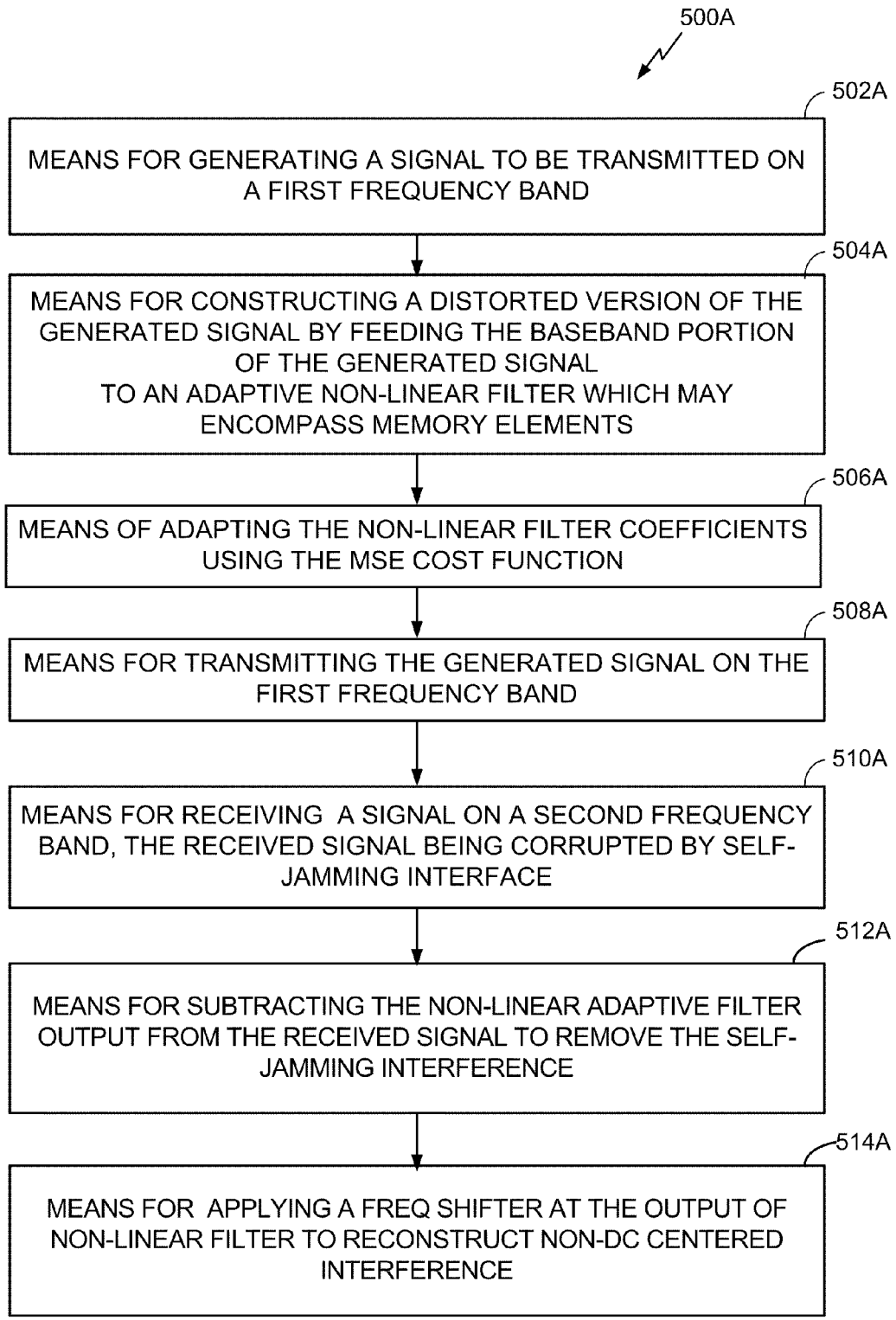
FIG. 5A illustrates example components capable of performing the operations illustrated in FIG. 5.

The various operations of methods described above may be performed by various hardware and/or software component(s) and/or module(s) corresponding to means-plus-function blocks illustrated in the Figures. For example, blocks 502-510 illustrated in FIG. 5 correspond to means-plus-function blocks 502A-510A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the disclosure, other and further embodiments of the disclosure may be devised without departing from the basic scope thereof, and the scope thereof is determined by the claims that follow.

What is claimed is:

1. A method, comprising:
   generating a signal to be transmitted on a first frequency band;
   constructing a distorted version of the generated signal by applying an adaptive non-linear filter to a baseband portion of the generated signal, wherein coefficients of the adaptive non-linear filter are generated by minimizing a MSE (Minimum Square Error) cost function;
   transmitting the generated signal on the first frequency band;
   receiving a signal on a second frequency band, the received signal being corrupted by self-jamming interference, wherein the self-jamming interference is caused by any type of non-linearities generated by transmit and receive chains; and
   subtracting the distorted version of the generated signal from the received signal to remove the self-jamming interference.

2. The method of claim 1, further comprising applying frequency shifting at an output of the adaptive non-linear filter for self-jamming interference which is not DC centered.

3. The method of claim 1, wherein the cost function is minimized by utilizing at least one of a least mean square (LMS) or a recursive least squares (RLS) algorithm.

4. The method of claim 3, wherein an error signal is generated by subtracting output of the adaptive non-linear filter from the received signal.

5. The method of claim 4, where the error signal is generated by subtracting output of the adaptive non-linear filter, after frequency shifting and low-pass filtering, from the received signal.

6. The method of claim 1, wherein the self-jamming interference comprises a p-order inter-modulation distortion where p>1.

7. The method of claim 6, wherein even-order non-linear filter operators are applied to the baseband portion of the generated signal.

8. The method of claim 6, wherein odd-order non-linear filter operators are applied to the baseband portion of the generated signal.

9. The method of claim 6, wherein even-order and odd-order non-linear filter operators are applied to the baseband portion of the generated signal.

10. The method of claim 6, wherein memory related effects are taken into account by augmenting the adaptive non-linear filter with digital memory elements and applying the adaptive non-linear filter and the digital memory elements to the baseband portion of the generated signal.

11. The method of claim 1, wherein the transmitted and received signals are wireless signals.

12. The method of claim 1, wherein the transmitted and received signals are wired signals.

13. The method of claim 1, wherein multiple signals transmitted simultaneously in a multi-mode or multi-carrier transceiver may result in reciprocal intermodulation products.

14. An apparatus, comprising:
means for generating a signal to be transmitted on a first frequency band;
means for constructing a distorted version of the generated signal by applying an adaptive non-linear filter to a baseband portion of the generated signal, wherein coefficients of the adaptive non-linear filter are generated by minimizing a MSE (Minimum Square Error) cost function;
means for transmitting the generated signal on the first frequency band;
means for receiving a signal on a second frequency band, the received signal being corrupted by self-jamming interference, wherein the self-jamming interference is caused by any type of non-linearities generated by transmit and receive chains; and
means for subtracting the additional distorted version of the generated signal from the received signal to remove the self-jamming interference.

15. The apparatus of claim 14, further comprising means for applying frequency shifting at an output of the adaptive non-linear filter for self-jamming interference which is not DC centered.

16. The apparatus of claim 14, wherein the cost function is minimized by utilizing at least one of a least mean square (LMS) or a recursive least squares (RLS) algorithm.

17. The apparatus of claim 16, wherein an error signal is generated by subtracting output of the adaptive non-linear filter from the received signal.

18. The apparatus of claim 17, where the error signal is generated by subtracting output of the adaptive non-linear filter, after frequency shifting and low-pass filtering, from the received signal.

19. The apparatus of claim 14, wherein the self-jamming interference comprises a p-order inter-modulation distortion where p>1.

20. The apparatus of claim 19, wherein even-order non-linear filter operators are applied to the baseband portion of the generated signal.

21. The apparatus of claim 19, wherein odd-order non-linear filter operators are applied to the baseband portion of the generated signal.

22. The apparatus of claim 19, wherein even-order and odd-order non-linear filter operators are applied to the baseband portion of the generated signal.

23. The apparatus of claim 19, wherein memory related effects are taken into account by augmenting the adaptive non-linear filter with digital memory elements and applying adaptive non-linear filter and the digital memory elements to the baseband portion of the generated signal.

24. The apparatus of claim 14, wherein the transmitted and received signals are wireless signals.

25. The apparatus of claim 14, wherein the transmitted and received signals are wired signals.

26. The apparatus of claim 14, wherein multiple signals transmitted simultaneously in a multi-mode or multi-carrier transceiver may result in reciprocal intermodulation products.

27. An apparatus, comprising:
at least one processor configured to:
generate a signal to be transmitted on a first frequency band, construct a distorted version of the generated signal by applying an adaptive non-linear filter to a baseband portion of the generated signal, wherein coefficients of the adaptive non-linear filter are generated by minimizing a MSE (Minimum Square Error) cost function, transmit the generated signal on the first frequency band, receive a signal on a second frequency band, the received signal being corrupted by self-jamming interference, wherein the self-jamming interference is caused by any type of non-linearities generated by transmit and receive chains, and subtract the additional distorted version of the generated signal from the received signal to remove the self-jamming interference; and
a memory coupled with the at least one processor.

28. A computer-program product comprising a non-transitory computer-readable medium having instructions stored thereon, the instructions executable by a processor for:
generating a signal to be transmitted on a first frequency band;
constructing a distorted version of the generated signal by applying an adaptive non-linear filter to a baseband portion of the generated signal, wherein coefficients of the adaptive non-linear filter are generated by minimizing a MSE (Minimum Square Error) cost function;
transmitting the generated signal on the first frequency band;
receiving a signal on a second frequency band, the received signal being corrupted by self-jamming interference, wherein the self-jamming interference is caused by any type of non-linearities generated by transmit and receive chains; and
subtracting the additional distorted version of the generated signal from the received signal to remove the self-jamming interference.

* * * * *